(12) United States Patent
Feron

(10) Patent No.: US 7,568,709 B2
(45) Date of Patent: Aug. 4, 2009

(54) PASSIVE STABILIZATION SYSTEMS FOR WHEELED OBJECTS

(75) Inventor: Eric Feron, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 475 days.

(21) Appl. No.: 10/613,613

(22) Filed: Jul. 3, 2003

(65) Prior Publication Data

US 2005/0000771 A1  Jan. 6, 2005

(51) Int. Cl.
    *B62B 5/00* (2006.01)
(52) U.S. Cl. ............... 280/47.24; 280/47.2; 280/47.26; 280/293; 190/18 A
(58) Field of Classification Search ............ 280/47.2, 280/47.24, 47.26, 47.16, 42, 43, 645, 79.2, 280/79.7, 79.11, 293, 767; 190/18 A
See application file for complete search history.

(56) References Cited

U.S. PATENT DOCUMENTS

| | | | | | |
|---|---|---|---|---|---|
| 2,973,209 | A | * | 2/1961 | Shaw | 280/755 |
| 3,394,942 | A | * | 7/1968 | Smith et al. | 280/5.24 |
| 3,856,321 | A | * | 12/1974 | Solymosi | 280/87.041 |
| 4,887,824 | A | * | 12/1989 | Zatlin | 280/87.042 |
| 5,054,803 | A | * | 10/1991 | Ellingsen, Jr. | 280/301 |
| 5,230,408 | A | | 7/1993 | Sadow | |
| 5,257,671 | A | | 11/1993 | Watkins | |
| 5,354,081 | A | * | 10/1994 | Huffman et al. | 280/87.01 |
| 5,379,870 | A | | 1/1995 | Sadow | |
| 5,423,561 | A | * | 6/1995 | Sadow | 280/37 |
| 5,511,806 | A | | 4/1996 | McNair | |
| 5,758,752 | A | | 6/1998 | King et al. | |
| 5,826,895 | A | * | 10/1998 | Bradfield | 280/87.042 |
| 5,855,385 | A | * | 1/1999 | Hambsch | 280/87.042 |
| 5,934,425 | A | | 8/1999 | Sadow | |
| 6,059,303 | A | * | 5/2000 | Bradfield | 280/87.042 |
| 6,331,012 | B1 | * | 12/2001 | Eisenmann et al. | 280/293 |
| 6,401,888 | B1 | | 6/2002 | Kuo | |
| 6,478,315 | B1 | | 11/2002 | Manesis | |
| 6,497,311 | B2 | | 12/2002 | Tiramani et al. | |
| 6,877,752 | B2 | * | 4/2005 | Edwards | 280/37 |
| 7,000,930 | B2 | * | 2/2006 | Smith | 280/87.021 |
| 7,004,481 | B1 | * | 2/2006 | Stanish | 280/37 |
| 7,172,205 | B1 | * | 2/2007 | Vujtech | 280/87.021 |
| 7,213,823 | B1 | * | 5/2007 | Vujtech | 280/87.021 |
| 2003/0234501 | A1 | * | 12/2003 | Cohen | 280/47.24 |

* cited by examiner

*Primary Examiner*—Christopher P Ellis
*Assistant Examiner*—Vaughn T Coolman
(74) *Attorney, Agent, or Firm*—Thomas J. Engellenner; Nutter McClennen & Fish LLP

(57) ABSTRACT

Apparatus and methods are disclosed for passive stabilization of a wheeled object by employing secondary wheels rotating about secondary axes offset from a common axis of a primary set of wheels, where the secondary wheels are positioned such that tilting of the object during rolling causes one of the secondary wheels to contact the surface and counteract tilting tendencies. The offset of the secondary axes can include angular, vertical, and/or horizontal components.

10 Claims, 11 Drawing Sheets

SIMULATION OF ROLL ANGLE OF TRADITIONAL SUITCASE (WHEELS MOUNTED ACROSS NARROWEST SIDE OF SUITCASE). NO STABILIZATION SYSTEM.

SIMULATION OF ROLL ANGLE OF TRADITIONAL SUITCASE (WHEELS MOUNTED ACROSS NARROWEST SIDE OF SUITCASE). WITH STABILIZATION SYSTEM.

SIMULATION OF ROLL ANGLE OF TRADITIONAL SUITCASE (WHEELS MOUNTED ACROSS NARROWEST SIDE OF SUITCASE). RUNNING PACE, NO STABILIZATION SYSTEM.

SIMULATION OF ROLL ANGLE OF TRADITIONAL SUITCASE (WHEELS MOUNTED ACROSS NARROWEST SIDE OF SUITCASE) AT RUNNING SPEED (4m/SEC). STABILIZED.

SIMULATION OF ROLL ANGLE OF CARRY-ON LUGGAGE (WHEELS MOUNTED ACROSS MEDIUM SIDE OF LUGGAGE). NO STABILIZATION SYSTEM. REGULAR WALK.

SIMULATION OF ROLL ANGLE OF CARRY-ON LUGGAGE (WHEELS MOUNTED ACROSS MEDIUM SIDE OF LUGGAGE). NORMAL PACE AND WITH STABILIZATION SYSTEM.

SIMULATION OF ROLL ANGLE OF CARRY-ON LUGGAGE (WHEELS MOUNTED ACROSS MEDIUM SIDE OF LUGGAGE). RUNNING PACE. NO STABILIZATION.

SIMULATION OF ROLL ANGLE OF TRADITIONAL SUITCASE (WHEELS MOUNTED ACROSS NARROWEST SIDE OF SUITCASE) AT RUNNING SPEED (4m/SEC). STABILIZED.

PASSIVE STABILIZATION SYSTEMS FOR WHEELED OBJECTS

BACKGROUND OF THE INVENTION

The present invention pertains to methods and devices for stabilizing wheeled objects, particularly wheeled luggage.

Wheeled luggage has greatly improved the ease with which travelers can transport their belongings. Unfortunately, wheeled luggage and other wheeled objects suffer from a lack of stability. As a person attempts to move a wheeled piece of luggage, its top-heavy nature can make it prone to tipping over, particularly when trying to turn or when moving at any appreciable speed. Prior art attempts to solve this problem have not been satisfactory. Some prior art devices try to improve stability by extending wheels out from the side in an effort to increase the track of the device. However, the narrow width of many luggage passageways, such as airplane aisles, limits this approach. Further, wheels extending beyond the sides of the luggage can cause a tripping hazard and make stowage difficult. Other prior art attempts have included a secondary set of fold-down wheels to provide four points of contact with the ground. This approach, likewise, can provide only limited stability and may needlessly complicate the transport of luggage and similar wheeled objects.

There exists a need for a simple stabilization device which increases stability without relying on increased track-width or complicated auxiliary mechanisms.

SUMMARY OF THE INVENTION

Apparatus and methods are disclosed for passive stabilization of a wheeled object by employing secondary wheels rotating about secondary axes offset from a common axis of a primary set of wheels, where the secondary wheels are positioned such that tilting of the object during rolling causes one of the secondary wheels to contact the surface and counteract tilting tendencies. The offset of the secondary axes can include angular, vertical, and/or horizontal components.

In one embodiment, the wheeled object has a primary wheel assembly comprising two wheels, spaced apart from each other and mounted to the object to rotate about a common primary axis, such that upon contact of the wheels with a surface, the primary wheels can roll along the surface to effect movement of the object in a direction perpendicular to the primary axis, and further includes at least one secondary wheel assembly comprising two secondary wheels, disposed on opposite sides of, and spaced further apart, than the wheels of the primary wheels assembly, each of the secondary wheels rotating about an axis different from the primary axis, such that tilting of the device during rolling causes one of the secondary wheels to contact the surface and counteract the tilting.

More specifically, the invention pertains to wheeled objects such as luggage, in which a luggage container has at least one primary wheel assembly comprising two wheels, spaced apart from each other and mounted to the luggage container to rotate about a common primary axis. The stabilization feature of the invention encompasses at least one secondary wheel assembly comprising at least two secondary wheels, disposed on opposite sides of, and spaced further apart than the wheels of the primary wheels assembly, each of the secondary wheels is further defined by a cant axis which is substantially similar to the y axis and an angle $\psi$ representing rotation about the cant axis relative to the vertical axis, the $\psi$ angle thus defining the orientation of the secondary wheel relative to a primary wheel and being chosen to restore stability if the wheeled object tips.

The angle $\psi$ is typically in the range of about 5° to 55° and more preferably in the range of about 10° to 40°. In certain applications it is also preferable that the secondary wheels be attached to the container at a location higher than the primary wheels so as to not interfere with conventional rolling operation of the wheeled object. The primary wheels can share an axel disposed along the common axis or be mounted on separate axels, each aligned along the primary axis. In one embodiment, the secondary wheels can each rotate about secondary axels that are joined to an axel of an associated primary wheel. It may also be preferable for each secondary axis to angle in an upward direction and/or a backwards direction with respect to the axis of an adjacent primary wheel.

In another aspect of the invention, stabilization devices are disclosed for wheeled objects having two primary wheels which rotate about a common axis to move the object along a surface by rolling, the stabilization device including a set of two secondary wheels, disposed on opposite external sides of the primary wheels, in which each of the secondary wheels rotates about a secondary axis that is angled away from the common axis of the primary wheels by an angle, such that tilting of the object during rolling causes one of the secondary wheels to contact the surface and counteract the tilting.

The invention further encompasses methods of stabilizing wheeled objects by adding offset secondary wheel on opposite external sides of the primary wheels. In use, each secondary wheel rotates about a secondary axis that is offset from the common axis of the primary wheels, such that tilting of the object during rolling causes one of the secondary wheels to contact the surface and counteract the tilting. The offset of the secondary axis can include angular, vertical and/or horizontal components.

The secondary wheels provide increased stability and contact the ground when the wheeled object becomes unstable. Any number of secondary wheels may be used although, in most instances, a single set of two secondary wheels on opposite sides of, and external to, the primary wheels is sufficient to increase stability. The secondary wheels may rotate around any axis that is not co-linear with the axis of rotation of the primary wheels. The secondary wheels may rotate on their own axels or they can be positioned on the same axel as one or more of the primary wheels. Where the secondary wheels are positioned on the same axel as a primary wheel, the axis of rotation of the secondary wheel will still be different from that of the axis of rotation of the primary wheel.

Most generally, the secondary wheels of the present invention may be positioned. anywhere on a wheeled body which will allow a secondary wheel to contact the ground when the wheeled body becomes unstable.

BRIEF DESCRIPTION OF THE DRAWINGS

The invention will be more fully understood from the following detailed description taken in conjunction with the accompanying drawings, in which like reference numerals designate like parts throughout the figures, and wherein:

FIG. 15A is a simulated graph of roll angle versus time for a carry-on sized conventional wheeled suitcase at 4 m/sec; while

DETAILED DESCRIPTION

The present invention provides stabilization for wheeled objects by employing a set of secondary wheels positioned to counteract tilt-induced rolling forces. If the wheeled object begins to tilt, the secondary wheels contact the ground and direct the wheeled body in the direction of tipping, thereby counteracting the instability or tendency to roll over.

Figure 1:
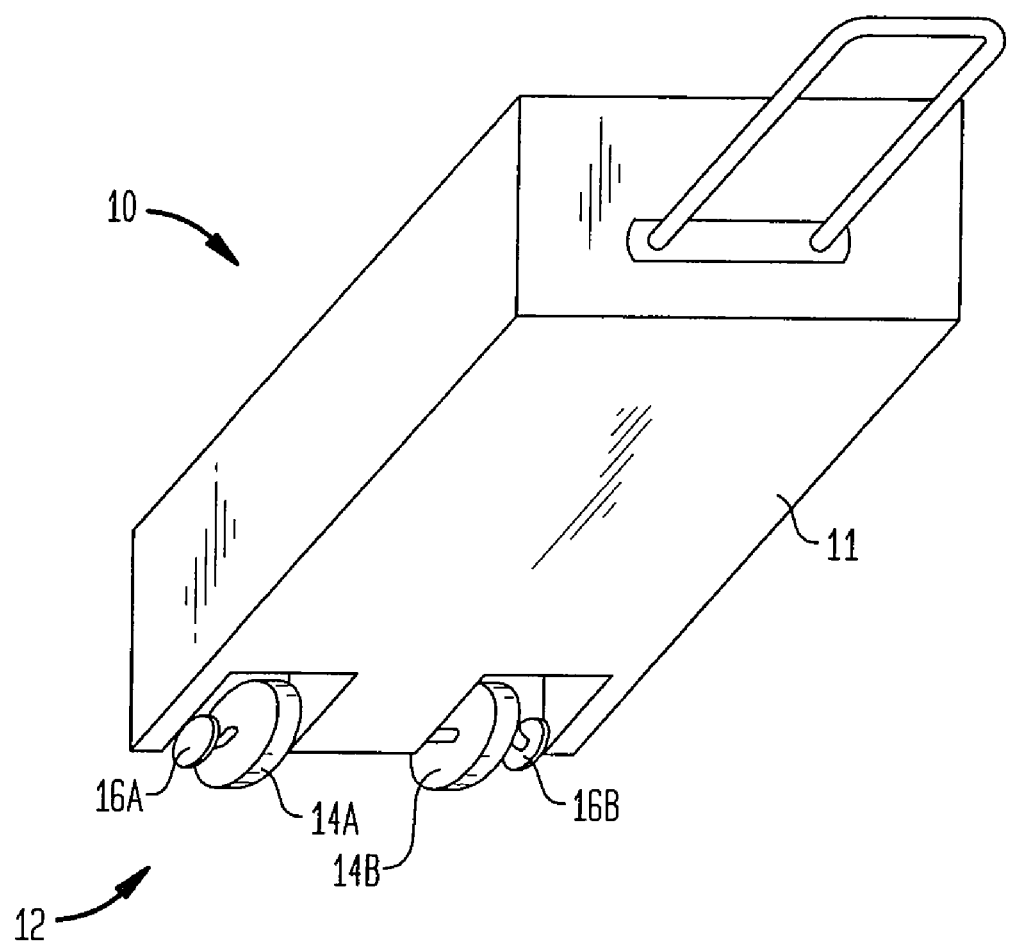
FIG. 1 is a schematic, perspective view of a passive stabilization system for wheeled objects according to the invention.

In FIG. 1 a wheeled object 10 with a stabilization system 12 according to the invention is shown. The wheeled object 10 includes a container or luggage body 11, with primary wheels 14A, 14B and secondary wheels 16A, 16B mounted thereto. Primary wheels 14A, 14B provide rolling support for the luggage body 11 and are positioned in a forward direction such that they can facilitate forward rolling movement as the object is pulled. Secondary wheels 16A, 16B are offset to provide anti-tipping stabilization.

The secondary wheels can provide stability to any wheeled object. Exemplary objects include luggage, carts and automobile trailers. The wheel object may include those towed by hand, by animal or by machine. Preferably, the wheeled object is luggage. Any type of wheeled luggage can benefit from the addition of the secondary wheels of the present invention, including both modern carry-on luggage and the classic suitcase with wheels.

The primary set of wheels includes those that support the wheeled object while rolling at equilibrium on a flat surface. The wheeled object may have any number of primary wheels, but in most cases two primary wheels will suffice to permit rolling movement of the object. Preferably, the two primary wheels rotate about a common axis, although the primary wheels may or may not be positioned on the same axel.

Figure 2:
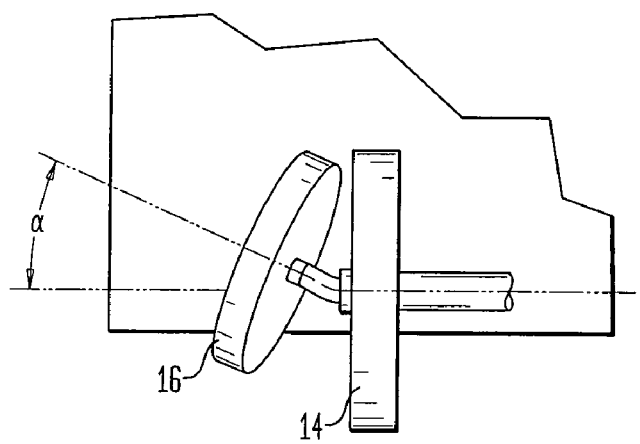
FIG. 2 is a more detailed, perspective view of one primary wheel and its associate secondary wheel of the system of FIG. 1.
Figure 3:
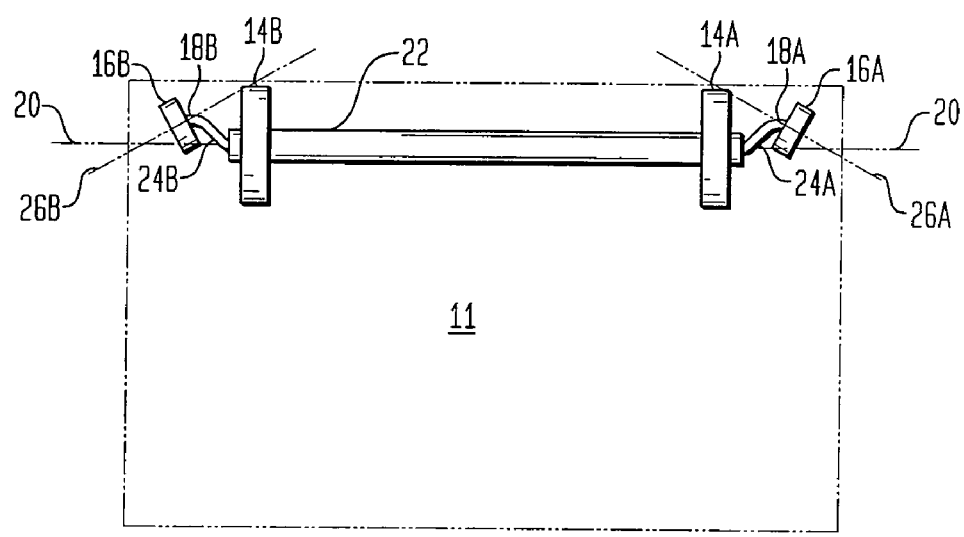
FIG. 3 is a top view of the primary/secondary wheel pair of FIG. 2.

FIG. 2 provides a more detailed schematic view of a wheel pair according to the invention including primary wheel 14 and secondary wheel 16, showing that the bottom rolling edge of secondary wheel 16 is offset vertically such that it does not contact the ground during normal rolling operation. FIG. 3 further shows that the secondary wheel 16 can be canted outward relative to the primary wheel 14, such that, upon tilting of the wheeled object, secondary wheel 16 will contact the ground and roll in such a way as to counteract tipping tendencies.

FIG. 3 provides a bottom view of the wheel pair of FIG. 2, showing that the secondary wheels 16A and 16B rotate about secondary axes, 26A and 26B, respectively that are distinct from the primary axis 20 of the primary wheels 14A and 14B. Although primary wheels 14A and 14B are shown connected to a common axel 22, it should be clear each wheel can just as easily rotate about an individual axel disposed along the common primary axis 20 to effect normal rolling movement of the object. In the embodiment of FIG. 3, the common axel 22 further includes linkages 24A and 24B to secondary axels 18A and 18B; however similar linkages between individual left and right primary axels and their respective secondary axels can be used substituted. Moreover, as discussed in more detail below in connection with FIG. 5, the primary and secondary axels need not be connected at all. The construction of yet further alternative mounts and rotational axels will be apparent to one skilled in the art.

Figure 4:
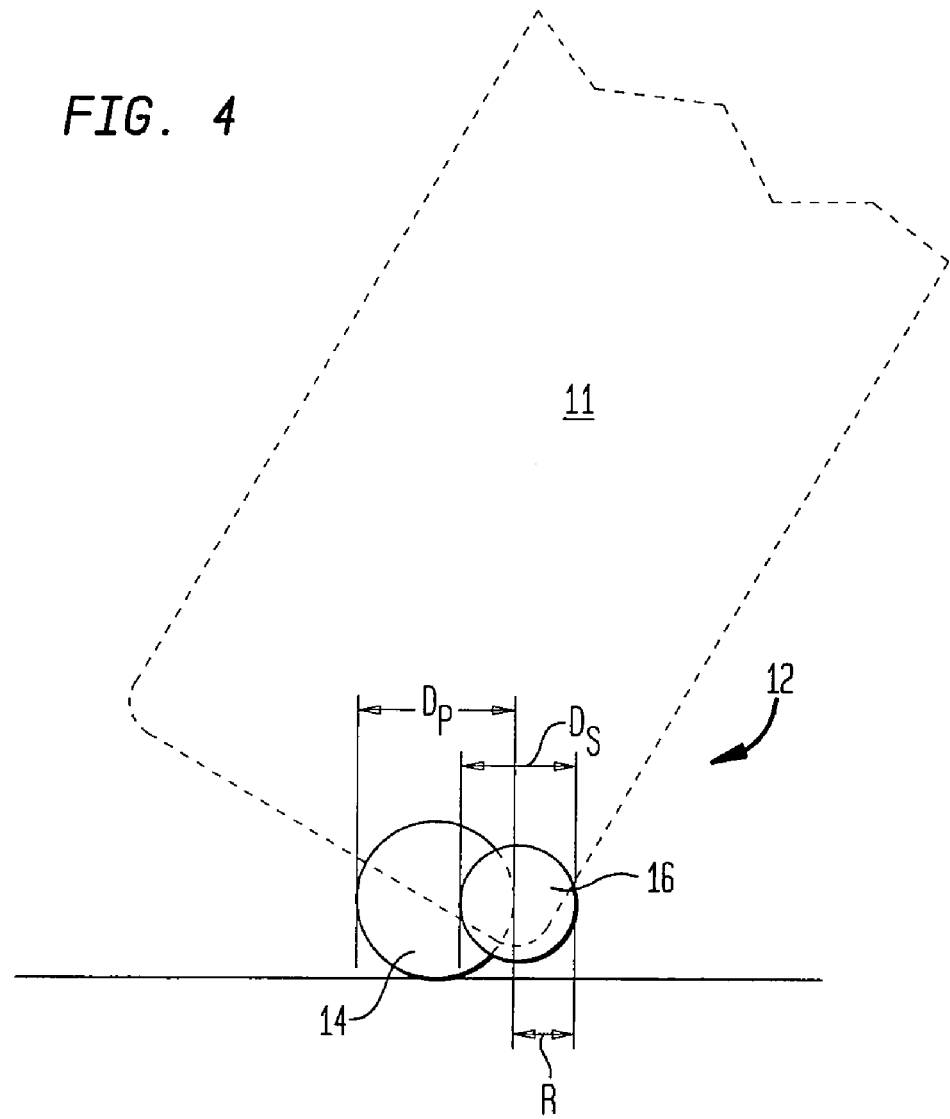
FIG. 4 is a side view of the primary/secondary wheel pair of FIG. 2.

In FIG. 4, a side view of a stabilization system 12 according to the invention is shown to illustrate that secondary wheel 16 can be of a different size than primary wheel 14 and that it can be forwardly (or backwardly) offset relative to the primary wheel. One set of preferred ranges for the diameter $D_s$ of the secondary wheel relative to the diameter $D_p$ primary wheel is discussed below. The desired offset R will vary with the size of the luggage and wheels, the normal pitch of the object when the primary wheels are engaged, and the desired rolling angle (at which the stabilized system is engaged). Typically R will range from zero to about $0.7 D_p$, more preferably from about 0.1 to about $0.5 D_p$.

With reference again to FIG. 2, it should be clear from the above discussion that the primary axis 20 and the secondary axes 26A and 26B need not intersect (because axels 18A and 18B can be both vertically and horizontally displaced from the primary axis. However, if such vertical/lateral displacements are ignored, the angular orientation of the primary and secondary axes can be readily determined. The angular offset of the secondary wheels relative to the primary wheels will thus be a combination of any outward and upward tilt of each secondary wheel. This angular offset (shown as α in FIG. 2) can range between about 0 degrees and 55 degrees. Angle α preferably ranges from 5 degrees to about 50 degrees and, more preferably, ranges between about 10 degrees and 40 degrees.

As discussed in more detail below, the offset of the secondary wheels can also be described in terms of their "cant"

axis, that is, a line through the diameter of the secondary wheel that is closest to vertical under nominal operation, as expressed in earth-bound coordinates. This cant axis can then be compared to the corresponding axis of the primary wheels (i.e., the vertical axis).

Figure 5:
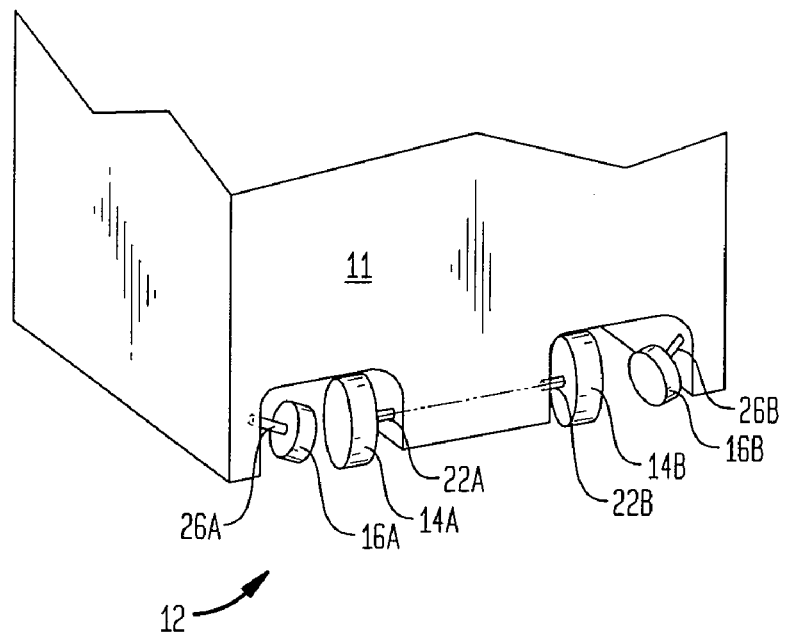
FIG. 5 is a schematic, perspective view of an alternative mounting scheme for a passive stabilization system for wheeled objects according to the invention.

The secondary wheels may share the same axel as a primary wheel as illustrated in FIGS. 2-4, or alternatively, the secondary wheels may be positioned on their own axles as shown for example in FIG. 5. In the embodiment of FIG. 5, the secondary wheels 16A and 16B are positioned slightly above and forward of the primary wheels with their axels 26A and 26B independently attached to the luggage body 11. (It should be appreciated that mounting mechanisms for wheels are plenary and well known to those skilled in the art. For convenience the present specification describes the wheels or axels as mounted to a luggage container or object but actual mounting can include an insert, wheel well, braces or any one of many equivalent structures. Moreover, the wheels and stabilization, systems of the present invention need not be permanently attached to the object but rather can be part of dolly or other attachable and detachable structure.)

Regardless of the secondary wheels' placement on the wheeled body or the angle of the secondary wheels' axis of rotation compared to the primary wheels, the secondary wheels preferably do not contact the ground while the wheeled body is in stable rolling motion. By positioning the secondary wheels above the primary wheels or angling the secondary wheels upward (angle $\alpha$) the secondary wheels may be elevated above the ground during normal operation on a flat surface. With the secondary wheels elevated, they do not disrupt normal rolling motion or undergo unnecessary wear.

Figure 6:
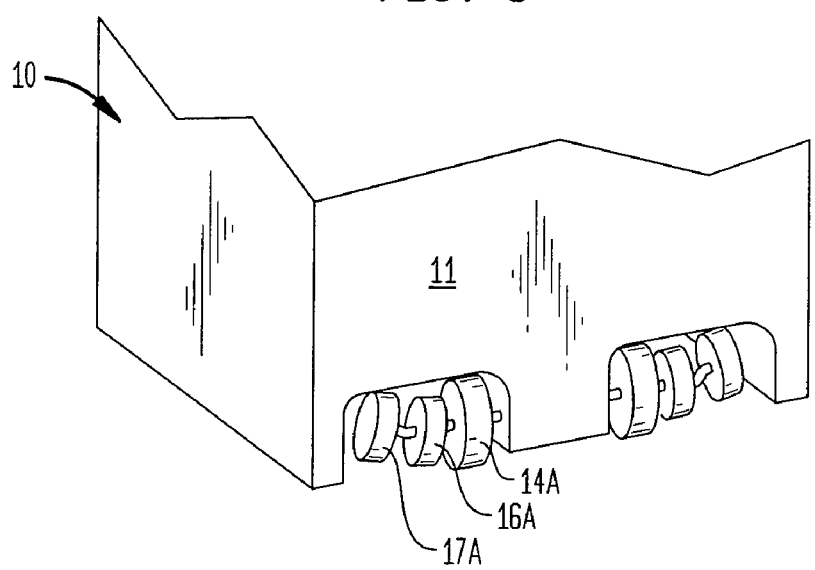
FIG. 6 is a schematic, perspective view of an alternative passive stabilization system for wheeled objects according to the invention.

FIG. 6 shows an alternative stabilization system 12 according to the invention. In this instance, the wheeled object 10 again includes a container or luggage body 11, with primary wheels 14A, 14B and secondary wheels 16A, 16B mounted thereto. A second set of stabilizing (tertiary) wheels 17A and 17B are offset from secondary wheels 16A, 16B to provide additional anti-tipping stabilization.

Figure 7:
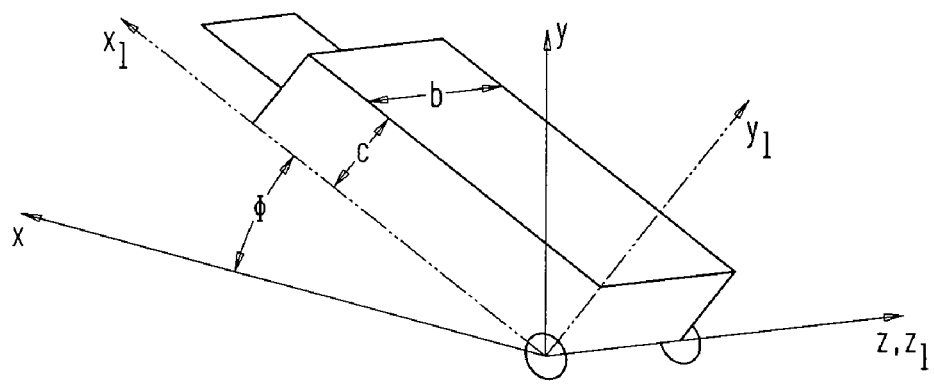
FIG. 7 is a schematic, perspective view of a wheeled object illustrating object-based and ground-based reference coordinates.
Figure 8:
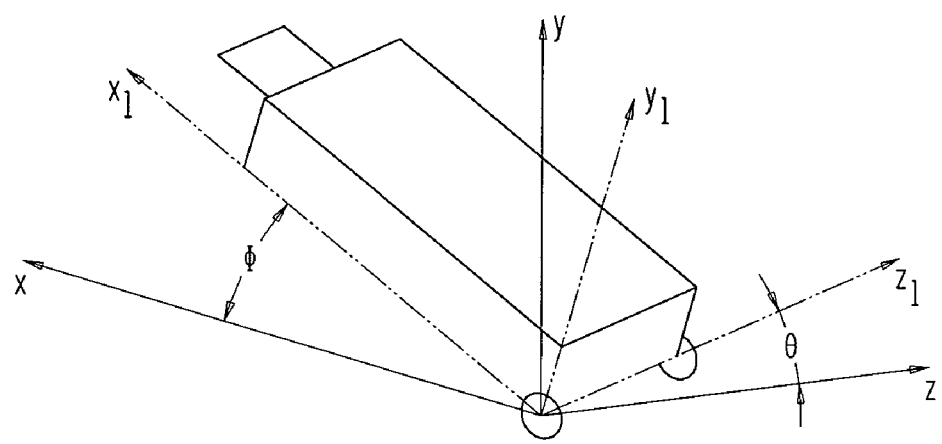
FIG. 8 is a schematic, perspective view of a wheeled object of FIG. 8 in which a roll angle has been introduced.

The orientation and position of the secondary wheels can further be described with the help of coordinate systems, as illustrated in FIGS. 7 and 8. The first coordinate system, (x, y, z) is aligned with the direction of motion of the luggage and attached to the earth. The x coordinate points along the direction of motion. They coordinate points upwards, and the z coordinate points across the direction of motion. The second coordinate system $(x_l, y_l, z_l)$ is attached to the luggage, as also shown in FIG. 7. For the sake of convenience, the origin of the coordinate system is centered on the secondary left wheel. FIG. 8 shows the same coordinate systems when the luggage is destabilized. In this figure, $\theta$ is the roll angle of the luggage.

To simplify the explanation, the orientation and position of the left secondary wheel will be described, but the explanation will also apply to the right secondary wheel which is symmetrically positioned on the opposite side of the wheeled body. The orientation of the secondary wheel will first be described and then its position with respect to the primary wheels will be explained.

Figure 9A:
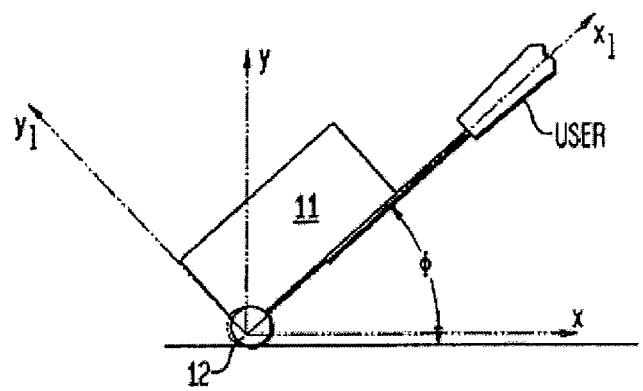
FIG. 9A is a schematic, side view of an passive stabilization system for wheeled objects according to the invention, further illustrating the reference coordinates.
Figure 9B:
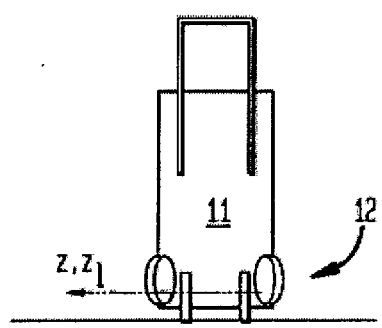
FIG. 9B is a front view of the system of FIG. 9A.
Figure 9C:
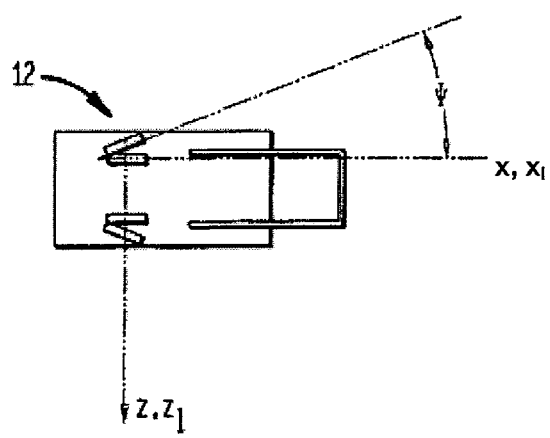
FIG. 9C is a bottom view of the system of FIG. 9A.
Figure 10:
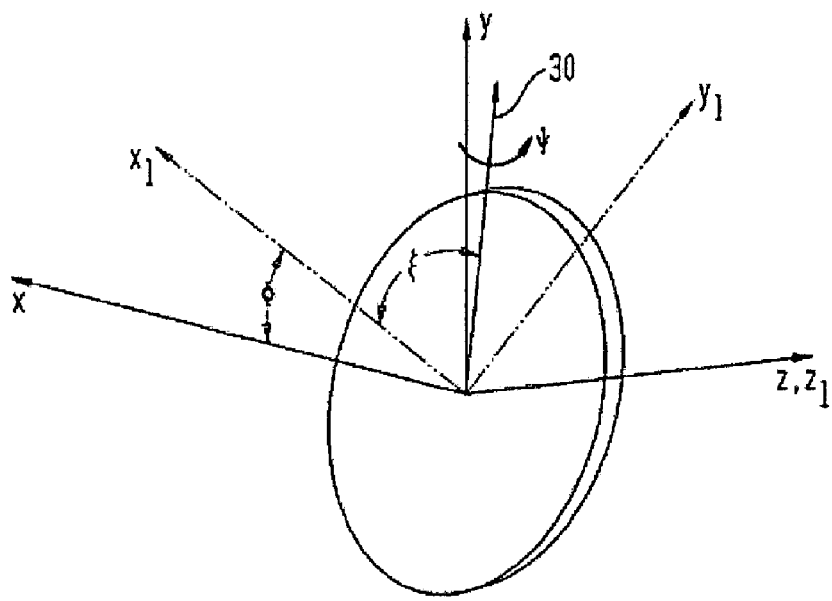
FIG. 10 is a schematic, perspective view of a secondary wheel according to the invention, illustrating its orientation relative to the wheeled object.

FIGS. 9A-9C provide a synopsis of the system for one particular luggage configuration. FIG. 9A is a schematic, side view of an passively stabilized wheeled luggage apparatus further illustrating the reference coordinates FIG. 9B is a front view of the system of FIG. 9A and FIG. 9C is a bottom view of the system of FIG. 9A;

The orientation of the secondary wheel is most easily described by reference to the orientation of the primary wheel. In most, if not all current luggage systems, the primary wheel is vertical and aligned with the luggage so that the two primary wheels (left and right) are parallel to the motion of the piece of luggage. The secondary wheel and one set of parameters to describe its orientation can be seen in FIG. 10 (along with FIGS. 9A-9C).

The orientation of the secondary wheels can be described by a rotation with respect to the nominal orientation of the luggage and the primary wheels. The rotation can be efficiently described by means of two parameters: The cant axis 30 and the angle of rotation $\psi$ which describes the angle with which the secondary wheel is rotated (canted) about the cant axis 30. To simplify calculations it can be assumed that the chosen angle of rotation is positive.

The preferable orientation of the secondary wheel is reached when cant axis 30 is reasonably close to vertical under nominal operation, as expressed in earth-bound coordinates. In other terms, when the luggage is used in operational, rolling position, the cant axis of the auxiliary wheel should be close to the earth-bound axis y. Notice the cant axis discussed here is NOT the axle of the wheel: The axle of the wheel is orthogonal to the cant axis.

Preferably, the angle $\psi$ has a value in the range of about 5° and 55° where the angle $\psi$ is measured as the secondary wheel rotates away from the forward direction. Even more preferably $\psi$ has a value in the range of about 10° to 40°. The angle $\psi$ for the opposite secondary wheel is preferably the same (but opposite in angular direction). Thus, each secondary wheel is canted outward relative to its associated primary wheel.

The location of the cant axis with respect to the x-axis may be described by the angle $\xi$ which is the angle between the coordinate axis $x_l$ and the cant axis. The angle $\xi$ can be chosen in the vicinity of 90-$\phi$ degrees, where $\phi$ is the "usual" pitch angle of the luggage when towed by its user. Pitch angle describes the angle created by inclining the luggage, for example, a pitch angle is created when a user grabs the handle of carry-on luggage and tilts the luggage toward him or her. This pitch angle varies as a function of the size of the traveler and the type of luggage. If $\phi$ is 50 degrees on average, then $\xi$ should be about 90–50=40 degrees. The cant axis, expressed in the coordinates system attached to the luggage can be described as follows:

$$x_l = \cos \xi$$

$$y_l = \sin \xi$$

$$z_l = 0 \qquad\qquad\qquad\qquad (\text{Eq. 1})$$

However, various constraints (relating, for example, to the wheel axel) can lead to small variations of this formula. More generally, the cant axis coordinates may be of the form:

$$x_l = \cos \xi \cos \zeta$$

$$y_l = \sin \xi \cos \zeta$$

$$z_l = \sin \zeta \qquad\qquad\qquad\qquad (\text{Eq. 2})$$

where $\zeta$ is a small angle (e.g., less than 40 degrees in absolute value).

Figure 11:
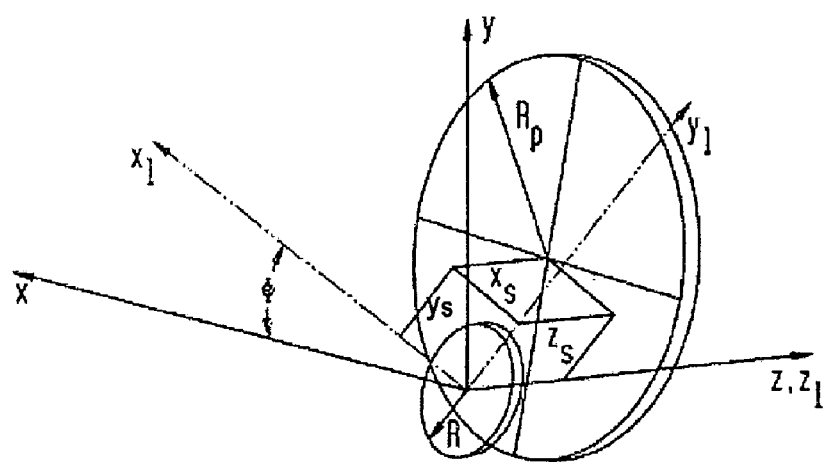
FIG. 11 is a schematic, perspective view of a secondary wheel according to the invention, illustrating its orientation relative to a primary wheel.

FIG. 11 illustrates a preferable positioning of the secondary wheel with respect to the adjacent primary wheel. Let $(x_s, y_s, z_s)$ be the position of the secondary wheel with respect to the primary wheel (in the coordinate system $(x_l, y_l, z_l)$) and let $D_p$ be the diameter of the primary wheels and $D_s$ the diameter of the secondary wheels.

In order for the secondary wheel not to be in contact with the primary wheel, it is necessary to have $$z_s > D_s/2 \sin \psi \qquad\qquad\qquad\qquad (\text{Eq. 3})$$

On the other hand, $z_s$ should not be so large that the secondary wheels significantly impact the track width of the primary wheels. Preferably $z_s$ represents less than 30% of the total width of the body.

In order for the secondary wheel not to touch the ground under nominal operating conditions, the condition $$D_s/2 + y_s \cos\phi + x_s \sin\phi \leq D_p/2 \quad \text{(Eq. 4)}$$

must be satisfied over the normal range of pitch angles $\phi$. Assuming the average pitch angle to be $\phi_0$, an efficient pick for $x_s$ and $y_s$ is $$y_s = (D_p - D_s)/2 \cos\phi_0 - \epsilon_y \text{ and}$$

$$x_s = (D_p - D_s)/2 \sin\phi_0 - \epsilon_x \quad \text{(Eq. 5)}$$

where $\epsilon_y$ and $\epsilon_x$ are two small numbers. In order to avoid premature wear and tear of the secondary wheels, these numbers can be chosen on the order of about 0.5 to about 20 millimeters, more preferably, in some instances, from about 1 to about 5 millimeters.

The roll angle $\theta$, which allows the secondary wheel to contact the floor surface, should preferably be small enough to allow early stabilization. Preferably, the roll angle $\theta$ at which the secondary wheel will first contact the ground is in the range of about 0 degrees to about 40 degrees and more preferably, the roll angle is in the range of about 3 degrees to about 20 degrees. A smaller roll angle also limits maximum steady-state oscillation angle (e.g., the maximum angle at which a roll-inducing upset can be stabilized by dampened oscillations).

Oscillation between opposed secondary wheels may occur under some conditions such as high walking or running speed. Under those conditions the wheeled body will alternate between tipping toward one side and then the other side, such that first one secondary wheel on one side contacts the ground and then as the body tips the other direction, the other secondary wheel contacts the ground. By choosing a small roll angle, the maximum tilt of the wheeled body during oscillating conditions will be limited. If the secondary wheels were absent, the same conditions would yield a complete tip-over of the luggage. Thus the limit cycling is not a drawback of the invention, but one of its benefits. This dampened oscillation provides stabilization.

The roll angle at which the secondary wheel touches the ground may be also adjusted by positioning the bottom of the secondary wheels above the bottom of the primary wheels. For example, where the primary and secondary wheels have the same diameter, the secondary wheels may be mounted at a point above the mounting point of the primary wheels. Alternatively, or in addition, the roll angle necessary for the secondary wheels to contact the ground may be adjusted by the selected cant angle.

In FIG. 11, the secondary wheel has a smaller diameter than the primary wheel. However, the diameter of the wheels could be chosen otherwise. Choosing a secondary wheel with smaller diameter may be preferable to reduced volume and provide a less bulky design. Since those wheels are used only to stabilize the piece of luggage, the reduced ride comfort created by wheels of smaller diameter should not be perceptible. Alternatively, the secondary wheels may be the same size or larger than the primary wheels so that the secondary wheels will have improved functionality over reasonably rough terrain (e.g. concrete). Typically, if $D_p$ is the diameter of the primary wheels and $D_s$ is the diameter of the secondary wheels, then $D_s$ can range from about 0.1 to about 1.5 $D_p$.

The set of primary wheels may be positioned on the same axel. Alternately, the primary wheels may rotate around separate axels. Even if the primary axels are positioned on separate axels, they preferably rotate around the same axis of rotation when the luggage is moving the forward direction. In one embodiment, the secondary wheels may rotate around secondary axels that are joined to an axel of an associated primary wheel.

Referring again to FIG. 6, which illustrates an embodiment in which more than one set of secondary wheels are employed, it should be clear that each secondary wheel in the string can be positioned to touch the ground at a larger and larger roll angle. For example, at a 5 degree roll angle the first secondary wheel may contact the ground, then at 10 degrees the second secondary wheel also touches the ground.

Dynamic simulations have been performed to obtain a quantitative evaluation of the performance of the proposed stabilization system. For these simulations, the angle of the secondary wheels $\psi$ was chosen to be on the order of 20 degrees. Two types of luggage have been simulated: A large suitcase (0.73 m×0.52 m×0.20 m) whose wheels are mounted across its narrowest side (thus the primary and secondary wheels are approximately 0.20 m apart), and a piece of carry-on luggage (0.60 m×0.30 m×0.23 m), whose wheels are mounted across its medium side (thus the primary and secondary wheels are approximately 0.30 m apart). The two devices have been simulated with and without the stabilization device, at two different velocities: Walking pace (approx. 1.5 m/sec), and running pace (approx 4 m/sec). The simulations begin after the luggage has been given an initial kick of 10 or 20 degrees (it was tilted, or in other words the initial roll angle was 10 or 20 degrees). The results are presented in FIGS. 12A-12B through 15A-15B.

Figure 12A:
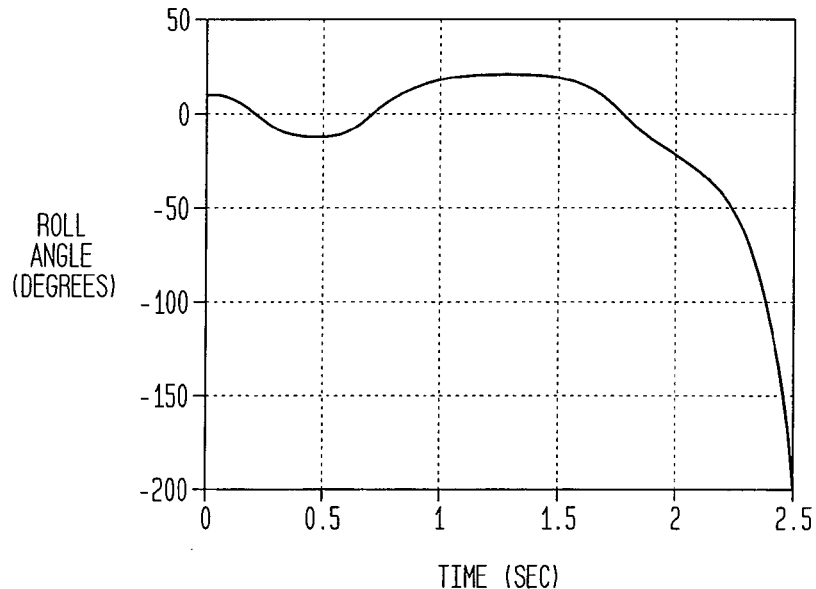
FIG. 12A is a simulated graph of roll angle versus time for a large conventional wheeled suitcase at 1.5 m/sec.
Figure 12B:
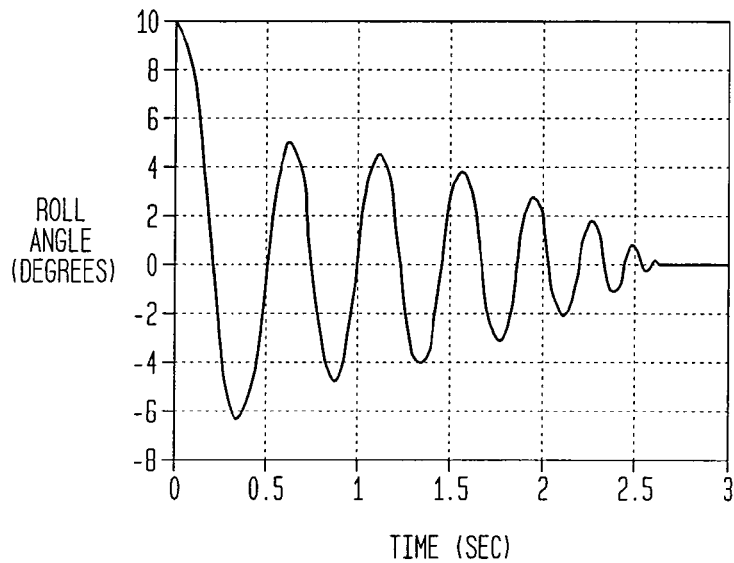
FIG. 12B is a similar graphic simulation for the same sized suitcase as modeled in FIG. 12A at the same speed but employing the stabilization system of the present invention.
Figure 13A:
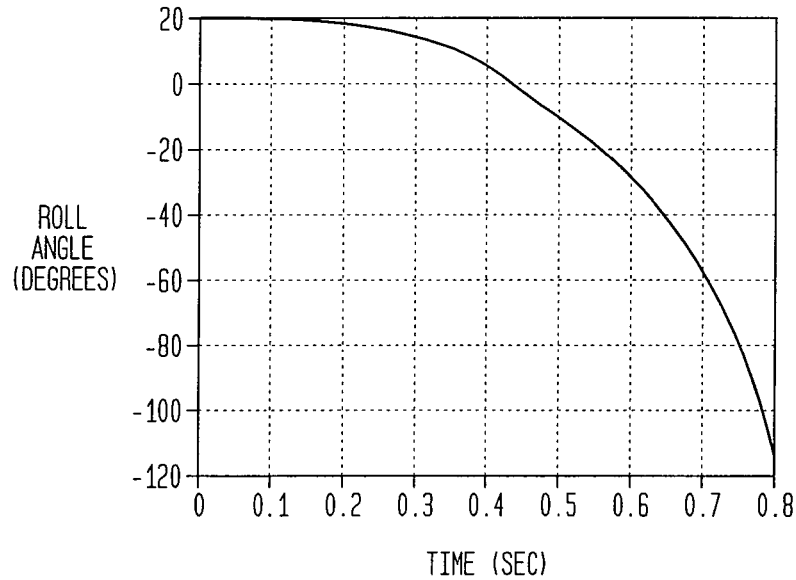
FIG. 13A is a simulated graph of roll angle versus time for a large conventional wheeled suitcase at 4 m/sec.
Figure 13B:
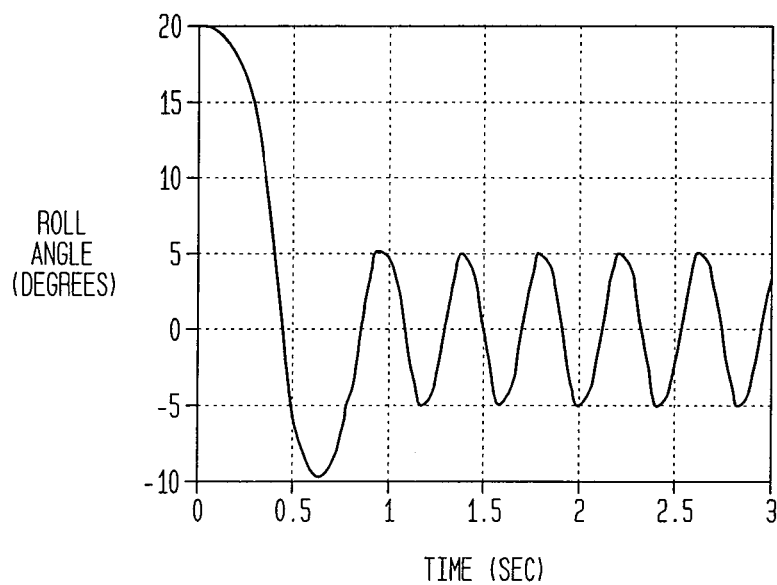
FIG. 13B is a similar graphic simulation for the same sized suitcase as modeled in FIG. 13A at the same speed but employing the stabilization system of the present invention.

FIG. 12A is a graph of roll angle versus time for the large suitcase without the stabilization device of the present invention. After starting with a roll angle of 10 degrees the large suitcase completely looses stability and falls over. In FIG. 12B the large suitcase recovers from the initial kick of 10 degrees and becomes stable. FIGS. 13A and 13B illustrate a similar affect for an initial roll angle of 20 degrees and a speed of 4 m/sec. The unstabilized suitcase falls over, while the stabilized suitcase reaches a stable oscillation. FIGS. 12 and 13 demonstrate that the large suitcase is stabilized for both low and high walking speed when released from a non-equilibrium position. At high speed (4 m/sec), the suitcase displays a stable oscillatory behavior with small amplitude which is considerably better than the performance of the same device without stabilization, and does not influence significantly the ride comfort for the passenger.

Figure 14A:
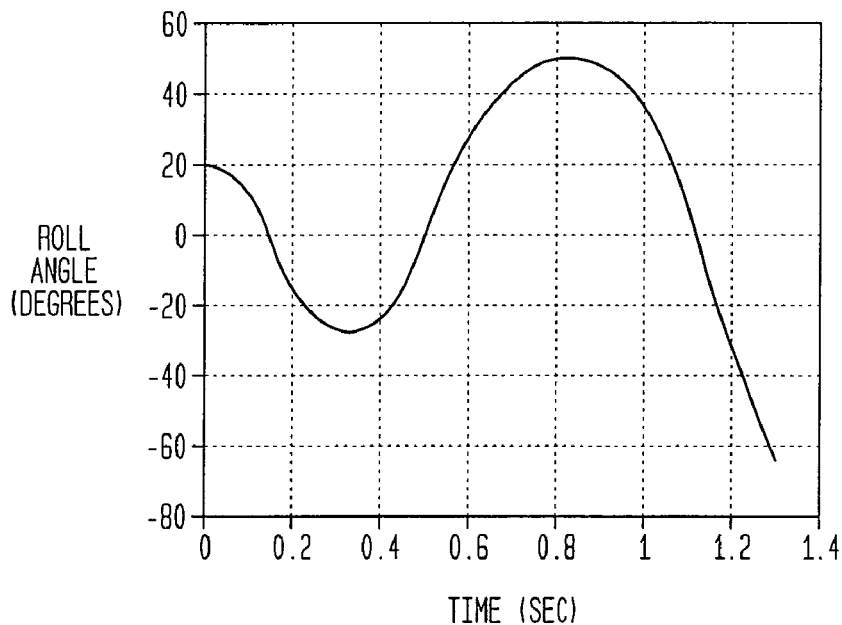
FIG. 14A is a simulated graph of roll angle versus time for a carry-on sized conventional wheeled suitcase at 1.5 m/sec.
Figure 14B:
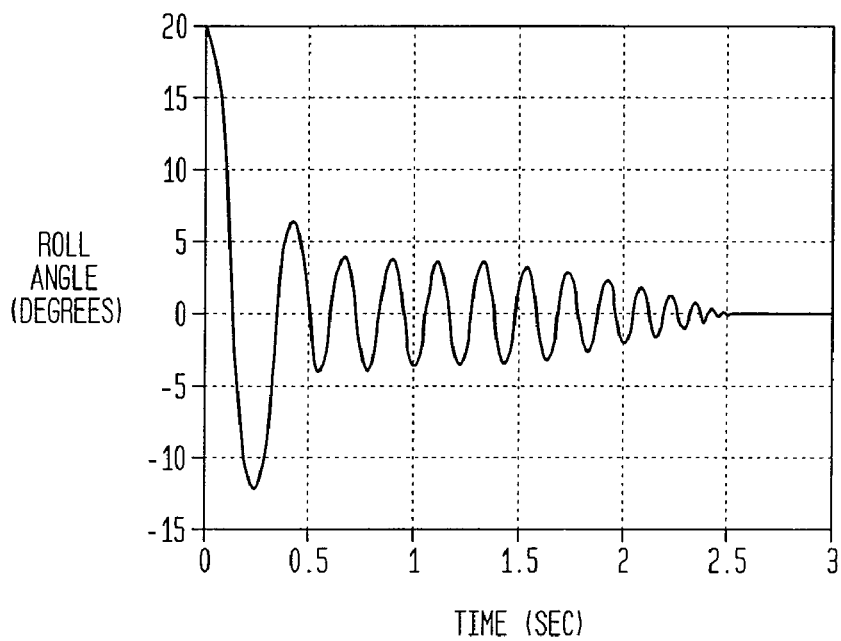
FIG. 14B is a similar graphic simulation for the same sized suitcase as modeled in FIG. 14A at the same speed but employing the stabilization system of the present invention.
Figure 15A:
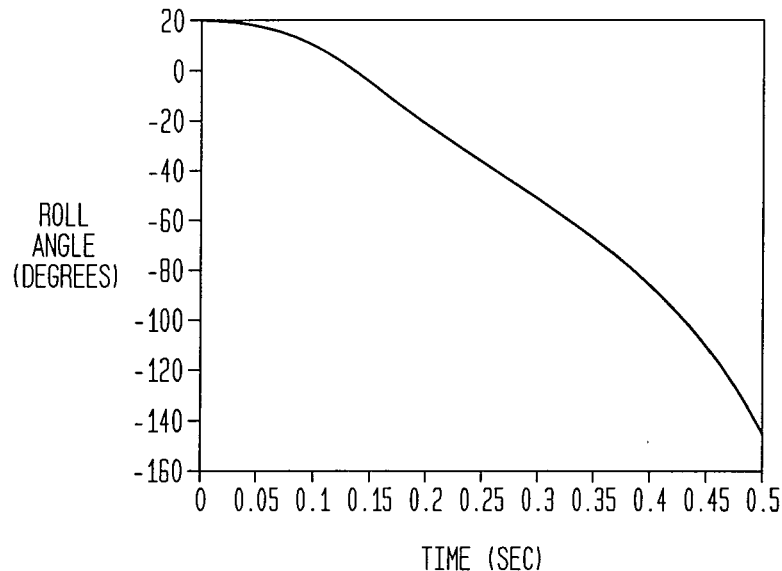
Figure 15B:
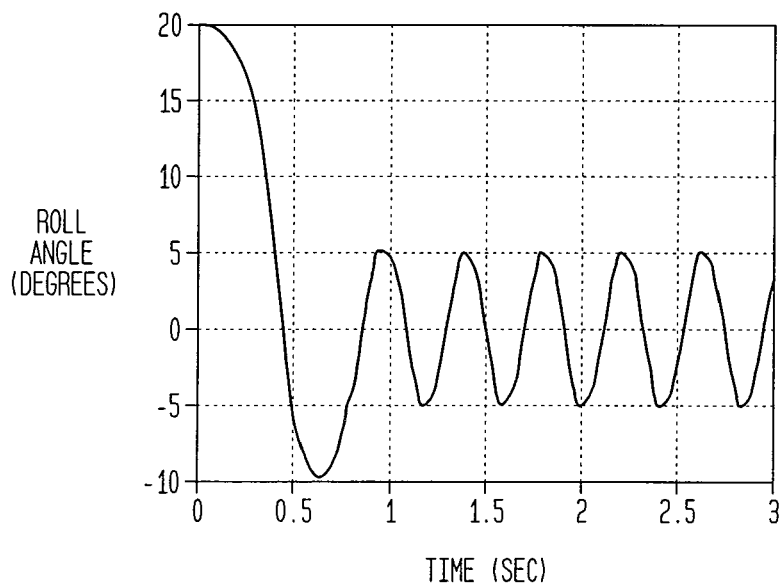
FIG. 15B is a similar graphic simulation for the same sized suitcase as modeled in FIG. 15A at the same speed but employing the stabilization system of the present invention.

The same observations can be made about the simulated carry-on luggage. As shown in FIGS. 14A-14B, the stabilization system can completely cancel any initial oscillation within seconds at low speeds. Likewise, at high speeds, as shown in FIGS. 15A-15B, these oscillations rapidly decrease towards a stable limit cycle of low amplitude.

The simulations clearly show that, regardless of the type of luggage under consideration, significant stability improvements may be obtained using the proposed invention. The use of stabilization wheels can influence wheeled luggage design. For example, wheeled luggage where the wheels are mounted across the narrowest side of the luggage can become popular again, because of the prospect of much more stable rolling operation, combined with the advantages of a narrow luggage track in cluttered environments such as when moving in a crowd or in a narrow aircraft aisle.

The invention claimed is:

1. A passively stabilized wheeled object comprising
an object body;
at least one primary wheel assembly comprising two wheels, spaced apart from each other and mounted to the object body to rotate about a common axis, the primary wheel assembly being defined by a first set of coordinates x, y and z, wherein x is the direction of motion, y is vertical and z is the direction along the common axis of the primary wheel assembly and a second set of coordinates $x_1$, $y_1$ and $z_1$ defined relative to the earth, such that when the object is at rest, the coordinates x, y and z substantially match $y_1$, $x_1$ and $z_1$, respectively, and when the object tips, an angle θ between the z and $z_1$ axes is greater than zero; and
at least one secondary wheel assembly comprising at least two secondary wheels, disposed on opposite sides of, and spaced further apart than the wheels of the primary wheels assembly, each of the secondary wheels is further defined by a cant axis and an angle ψ that is not equal to zero and represents rotation about the cant axis in a direction away from the x axis such that the secondary wheel assembly is not aligned with the direction of motion;
wherein the secondary wheel assembly restores the angle θ to zero when the object tips.

2. The apparatus of claim 1 wherein the cant axis is defined by an angle ξ which is the angle between the coordinate axis $x_1$ and the cant axis, and expressed in the coordinates system attached to the wheeled object as follows:

$x_1 = \cos\xi$ $y_1 = \sin\xi$ $z_1 = 0$.

3. The apparatus of claim 2 wherein the angle ξ is chosen to be about 90-φ degrees, where φ is the "usual" pitch angle of the wheeled object when towed by its user.

4. The apparatus of claim 1, wherein the absolute value of the angle ψ is in the range of about 5 degrees to about 55 degrees.

5. The apparatus of claim 1, wherein the absolute value of the angle ψ is in the range of about 10 degrees to 40 degrees.

6. The apparatus of claim 1 wherein the primary wheels rotate about a primary axis and the secondary wheels rotate about secondary axes, and wherein the secondary axis of each of the secondary wheels is displaced vertically from the primary axis of the primary wheels.

7. The apparatus of claim 1 wherein the primary wheels rotate about a primary axis and the secondary wheels rotate about secondary axes, and wherein the secondary axis of each of the secondary wheels is displaced laterally from the primary axis of the primary wheels.

8. The apparatus of claim 1 wherein the diameter of each of the secondary wheels is smaller than the diameter of the primary wheels.

9. The apparatus of claim 1 wherein the apparatus further comprises more than one set of secondary wheels.

10. The apparatus of claim 1 wherein the object body further comprises a luggage container.

* * * * *